(12) United States Patent
Doten

(10) Patent No.: US 9,192,797 B2
(45) Date of Patent: Nov. 24, 2015

(54) FIRE SUPPRESSION GEL BLENDER AND AIRBORNE DELIVERY SYSTEM

(76) Inventor: Leonard E. Doten, Cold Springs, CA (US)

(*) Notice: Subject to any disclaimer, the term of this patent is extended or adjusted under 35 U.S.C. 154(b) by 738 days.

(21) Appl. No.: 12/660,044

(22) Filed: Feb. 19, 2010

(65) Prior Publication Data

US 2011/0203812 A1 Aug. 25, 2011

(51) Int. Cl.
| A62C 11/00 | (2006.01) |
| A62C 3/02 | (2006.01) |
| A62C 5/033 | (2006.01) |
| B64D 1/16 | (2006.01) |
| B64C 27/04 | (2006.01) |

(52) U.S. Cl.
CPC .............. *A62C 3/0235* (2013.01); *A62C 5/033* (2013.01); *B64D 1/16* (2013.01); *B64C 27/04* (2013.01)

(58) Field of Classification Search
CPC ...... A62C 3/0235; A62C 5/033; B64C 27/04; B64C 1/16; F04D 13/086
USPC ................. 239/171; 169/14, 53, 44; 417/360, 417/423.3, 423.15
See application file for complete search history.

(56) References Cited

U.S. PATENT DOCUMENTS

| 3,714,987 | A | * | 2/1973 | Mattson | 169/47 |
| 4,601,345 | A | * | 7/1986 | Mahrt | 169/53 |
| 4,786,239 | A | * | 11/1988 | Eberhardt | 417/238 |
| 6,003,782 | A | * | 12/1999 | Kim et al. | 239/171 |
| 2006/0175429 | A1 | * | 8/2006 | Lanigan et al. | 239/171 |
| 2008/0164039 | A1 | * | 7/2008 | Sabo | 169/62 |
| 2009/0078434 | A1 | * | 3/2009 | Archambault | 169/53 |
| 2009/0223682 | A1 | * | 9/2009 | Ramos | 169/46 |

* cited by examiner

Primary Examiner — Arthur O Hall
Assistant Examiner — Viet Le
(74) Attorney, Agent, or Firm — Heisler & Associates

(57) ABSTRACT

The delivery system includes a blender assembly which can be fitted within a bucket or other container an aircraft. The blender assembly includes a combiner which receives water from within the container and gel concentrate from a gel inlet. The combiner brings the water and gel concentrate together upstream of a pump. The pump pressurizes and mixes the water and gel concentrate together to provide a hydrated fire suppression gel ready for application. An outlet of the pump leads through appropriate conduits to a nozzle. The nozzle includes a downwardly extending spout which sprays the hydrated gel down onto the ground beneath the aircraft. When the water within the container has been depleted, the aircraft is flown to a water source and the container is refilled. Then the blender can again be used to manufacture and deliver the fire suppression gel to an area to be treated.

7 Claims, 4 Drawing Sheets

FIRE SUPPRESSION GEL BLENDER AND AIRBORNE DELIVERY SYSTEM

FIELD OF THE INVENTION

The following invention relates to fire suppression systems and particularly fire suppression systems carried by aircraft, such as for use in fighting wildfires. More particularly, this invention relates to fire suppression gel blenders which mix a gel concentrate with water and systems which mount such fire suppression gel blenders upon an airborne delivery system for delivery of fire suppression gel from fire fighting aircraft and other platforms.

BACKGROUND OF THE INVENTION

In the fighting of wildfires, a variety of fire suppression materials are known, as well as equipment for delivery of such fire suppression materials. Perhaps the most common fire suppression material is liquid water. Water can be delivered on a fire, or a space which is to be treated in advance to stop the progression of a fire, in a variety of different ways. For instance, hoses can deliver water from a stationary source such as a fire hydrant, or from a mobile source such as a fire truck. Water trucks are known which can deliver water from tanks on the vehicle to ground adjacent the vehicle, with or without use of hoses.

Aircraft can also be used for delivery of water for fire suppression. While fixed wing aircraft are sometimes used, most often water is delivered by rotating wing aircraft. In a typical such system, a bucket is suspended from a helicopter. The bucket can be dipped into a water reservoir to fill the bucket. The helicopter then transports the bucket to an area to be treated with the water. A floor or other portion of the bucket is openable to drain the bucket of water and treat the area beneath the bucket. The helicopter then repeats the filling procedure for additional treatment of areas with water. One such line of buckets is provided by S.E.I. Industries, Ltd. of Delta, British Columbia, Canada under the trademark BAMBI BUCKET.

Fire suppression gels are known in the art to have a greater effectiveness in suppressing fire than water alone. Such gels typically begin in the form of a concentrate which can be a solid or a liquid having a high concentration of gel compositions therein. This gel is hydrated to a most desirable water and gel mixture ratio and then is applied to an area to either directly extinguish fire or to treat an area in advance of an approaching fire to impede the progress of the fire, or otherwise suppress fire in the area being treated. Such fire suppression gels, when mixed with water, greatly enhance the effectiveness of the water in suppressing the fire. In particular, the water in the hydrated gel does not evaporate as quickly as water alone, thus maintaining a coating of the area to be treated and discouraging the combustion of combustible materials in the area being treated.

One such fire suppression gel is provided by Ansul Canada Limited of Toronto, Ontario, Canada (dba "Wildfire") under the trademark AFG FIREWALL in the form of a liquid emulsion.

While the use of such fire suppression gels is known when treating an area with fire hoses either coupled to stationary sources of water or hydrated gel; or from mobile ground sources (such as tanker trucks), a need exists for an effective airborne fire suppression gel delivery system. While a bucket or other container filled with hydrated gel could be utilized, such an arrangement would be inefficient in that frequent return trips to a source of hydrated gel would be required. Accordingly, a need exists for a system for onboard manufacture of such a water and fire suppression gel mixture on an airborne platform.

Furthermore, water buckets and fixed tanks deliver water to an area to be treated for fire suppression in a rather imprecise manner, merely involving the opening of a lower portion of the bucket or tank. While generally effective for water having a lower fire suppression capacity, with the utilization of fire suppression gel is it desirable that a mixture of water and fire suppression gel be applied to an area to be treated in a precise manner to maximize the fire suppression capability of the gel and minimize the number of repeat trips required and maximize the area being treated by an airborne vehicle.

SUMMARY OF THE INVENTION

With this invention a fire suppression gel blender is provided suitable for use in an airborne delivery system to provide high efficiency delivery of fire suppression gel in fire fighting situations, where the urgency of the situation greatly benefits from efficiency and effectiveness of the delivery system. The overall delivery system includes known prior art aircraft, and particularly rotating wing aircraft, as well as water containing buckets for suspension beneath such aircraft or other known water containing structures. With this invention, the aircraft is modified to include a tank of gel concentrate or other gel source. The bucket or other water containing structure is modified to include a fire suppression gel blender assembly adjacent thereto.

This blender assembly includes a water inlet for receiving water contained within the bucket or other container. A combiner adds concentrated fire suppression gel from the source of gel carried by the aircraft, such as by supplying the gel concentrate along a conduit line extending from the aircraft down to the blender assembly within the bucket. A pump is provided, preferably downstream of the water inlet and gel inlet. This pump both pressurizes the water and gel mixture, as well as functioning to enhance the mixing of the water and fire suppression gel mixture.

The pressurized water and fire suppression gel mixture, referred to herein as hydrated gel, is then delivered to a discharge. This discharge is preferably in the form of a nozzle, typically adjacent the bucket and pointed generally downward. When the blender assembly is powered by powering of the pump, the hydrated gel is simultaneously manufactured and sprayed downward from the bucket. The aircraft can be flown at a variable height to adjust a width of lines being treated with fire suppression gel, a process called "striping." When the aircraft flies lower this line is narrower. When the aircraft flies higher this line is wider. A density with which hydrated gel is applied to the area to be treated can be adjusted by adjusting a speed at which the aircraft travels.

When the supply of water has been depleted, the aircraft returns to a water reservoir to refill the water container such as by dipping the bucket into the water reservoir as is known in the prior art. The aircraft can then be returned to the area to be treated and the system again commences operation. The aircraft most preferably carries a supply of fire suppression gel concentrate which lasts at least an amount of time similar to an amount of time that a fuel supply for the aircraft lasts. In this way, when the aircraft is required to return to a base for refueling, the source of gel concentrate can also be replenished.

While the preferred embodiment of this invention involves the installation of the blender assembly within or adjacent a water containing bucket, as an alternative to such fitting within existing buckets, a separate customized structure could be combined with the blender assembly to function according to this invention. Such an assembly could be suspended below the aircraft or mounted to an underside or other portion of the aircraft, or to some other mobile platform, such as a truck.

While the hydrated gel is preferably delivered from a nozzle having a predictable spray pattern emanating therefrom, other forms of discharges could be provided downstream of the pump. As an alternative, the pump could discharge back into the bucket and the water and fire suppression gel combination could be delivered by opening of the bucket as water alone is currently known to be dispensed from an aircraft borne bucket.

Other details of this invention and various embodiments of this invention are described in conjunction with the further written description of this invention provided below.

OBJECTS OF THE INVENTION

Accordingly, a primary object of the present invention is to provide a fire suppression gel delivery system which can be coupled to an aircraft and spray fire suppression gel onto an area to be treated.

Another object of the present invention is to provide a fire suppression gel delivery system which manufactures fire suppression gel by hydrating gel concentrate onboard a mobile platform immediately before discharge of the hydrated gel onto an area to be treated.

Another object of the present invention is to provide a method for fighting wildfires which involves spraying fire suppression gel in stripes of varying densities and widths upon an area to be defended or directly around the fire perimeter itself.

Another object of the present invention is to provide a method for blending and delivering fire suppression gel from an airborne delivery platform.

Another object of the present invention is to provide a fire suppression gel discharge coupleable to a water containing bucket or other structure and with a water and fire suppression gel blender upstream of the discharge to utilize water from the container to hydrate the fire suppression gel before delivery from the discharge.

Another object of the present invention is to maximize the efficiency with which water is utilized by fire fighters in fighting fires.

Another object of the present invention is to provide a fire suppression gel blender which can be used on mobile platforms to blend water with gel concentrate immediately before spraying.

Another object of the present invention is to provide a method for controlling a width and density of striping of fire suppression gel upon an area to be treated with fire suppression gel.

Other objects of the present invention will become apparent from a careful reading of the included drawing figures, the claims and detailed description of the invention.

DESCRIPTION OF THE PREFERRED EMBODIMENT

Figure 1:
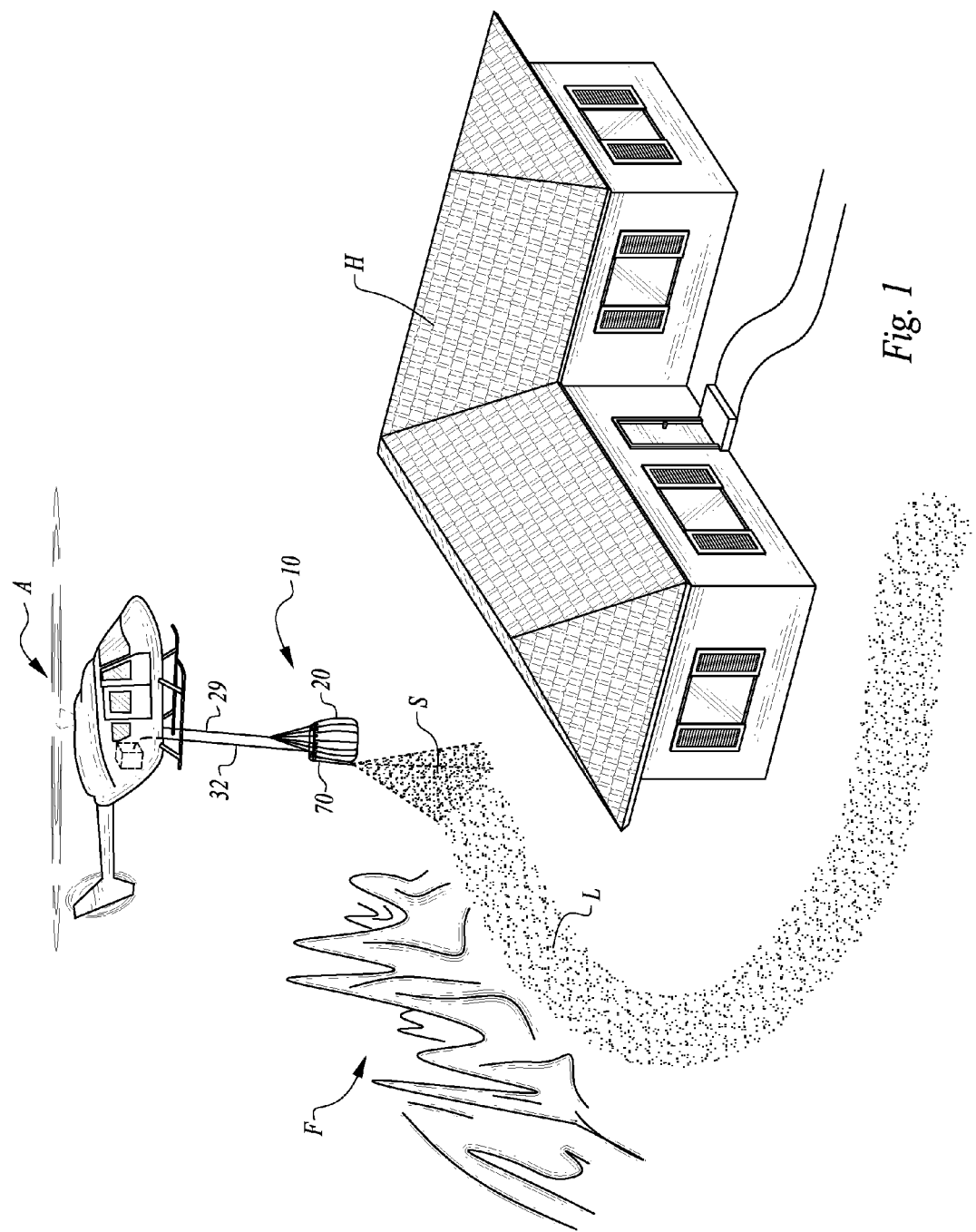
FIG. 1 is a perspective view of an environment where the system of this invention is being utilized to provide a fire suppression barrier line between a house and an advancing wildfire according to an embodiment of this invention.

Referring to the drawings, wherein like reference numerals represent like parts throughout the various drawing figures, reference numeral 10 is directed to a delivery system for manufacture and delivery of fire suppression gel. The delivery system 10 can be mounted within a bucket 20 suspended from an aircraft A. The system 10 discharges fire suppression gel from a nozzle 70 in the form of a spray S of hydrated fire suppression gel. This spray S can form a line L in a process referred to as "striping" to provide a barrier between an advancing fire F and a house H or other structure to be defended.

Figure 2:
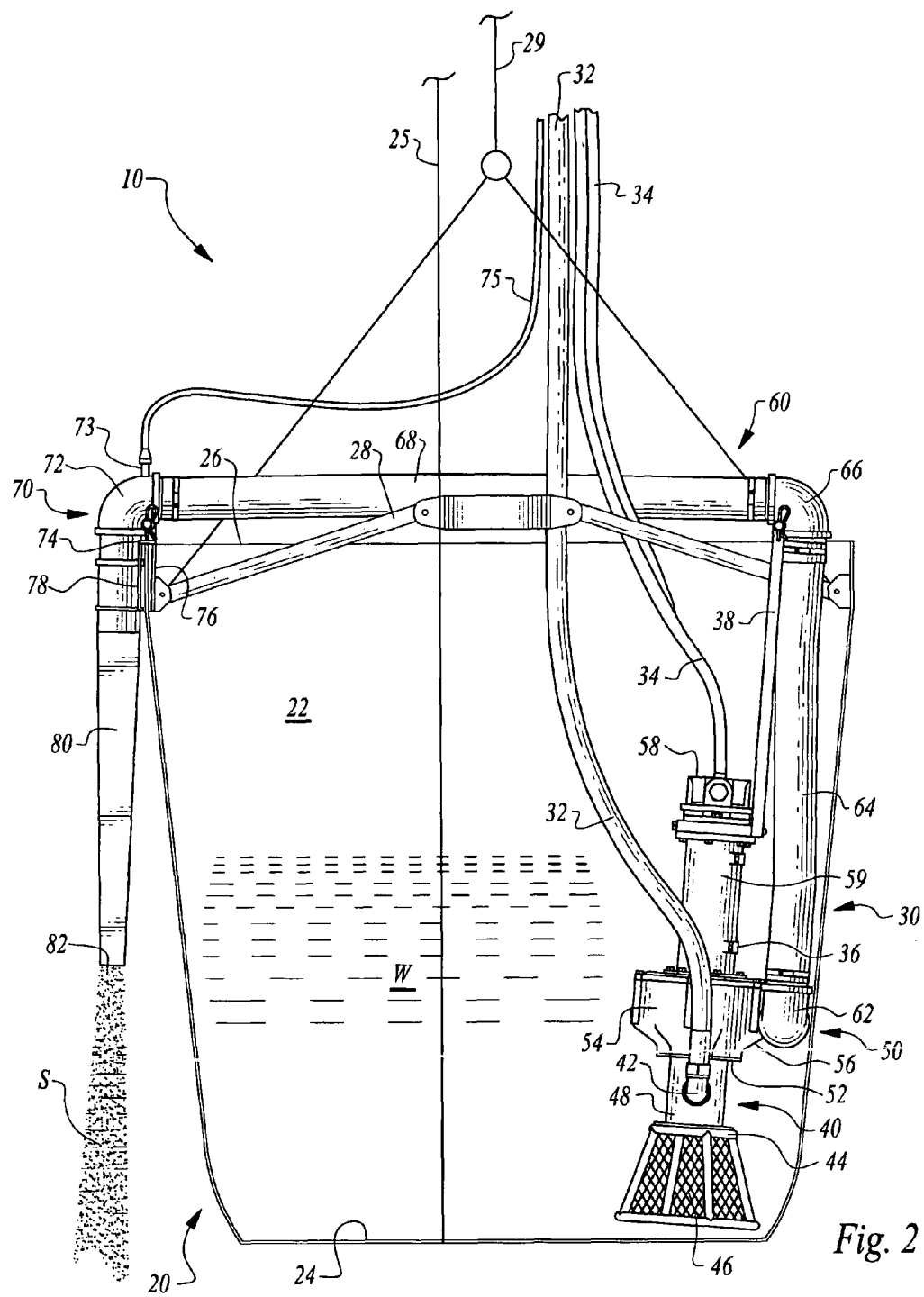
FIG. 2 is a full sectional view of a water bucket containing the gel blender and discharge nozzle coupled thereto, according to the FIG. 1 embodiment of this invention.

In essence, and with particular reference to FIG. 2, basic details of the fire suppression gel blending and delivery system 10 of this invention are described, according to a preferred embodiment. The delivery system 10 and associated blender assembly 30 can be mounted to various different water containing structures, but are most preferably configured in this preferred embodiment to be mounted to a bucket 20 configured to be suspended from an aircraft A, such as a helicopter (FIG. 1).

The blender assembly 30 includes a combiner 40 which is configured to receive water W from the bucket 20 and gel concentrate from a gel reservoir, typically borne by the aircraft A and transported to the combiner 40 along a gel concentrate supply line 32. The combiner 40 mixes water with the gel concentrate upstream of a pump 50. The pump 50 pressurizes the now hydrated gel as well as performing a mixing function to thoroughly mix the water W and gel concentrate to form the hydrated fire suppression gel ready for delivery and use in fire suppression. Various interconnect conduits 60 lead from the pump 50 to a nozzle 70. The nozzle 70 is a preferred form of discharge that includes a spout 80 pointing generally downward to provide the spray S of hydrated gel downward from the aircraft A, or otherwise away from a vehicle carrying the entire delivery system 10.

More specifically, and with continuing reference to FIG. 2, details of the bucket 20 for supporting the delivery system 10 of this invention, are described according to this preferred embodiment. While the delivery system 10 of this invention could be mounted to other structures, in this embodiment shown in FIGS. 1-8, the delivery system 10 is configured to be mounted to a bucket 20 (or other container) which has been configured for fire suppression by dumping water W in an area to be treated.

In particular, the bucket 20 includes side walls 22 extending up from a floor 24, so that the bucket 20 has a generally cylindrical form. The walls 22 extend approximately vertically while the floor 24 extends approximately horizontally. A suspension assembly 28, also referred to as a "spider" holds open an upper end of the bucket 20 defined by a lip 26. Suspension lines 29 are coupled to the bucket 20 and extend up to an aircraft A (FIG. 1) such as a helicopter.

Figure 8:
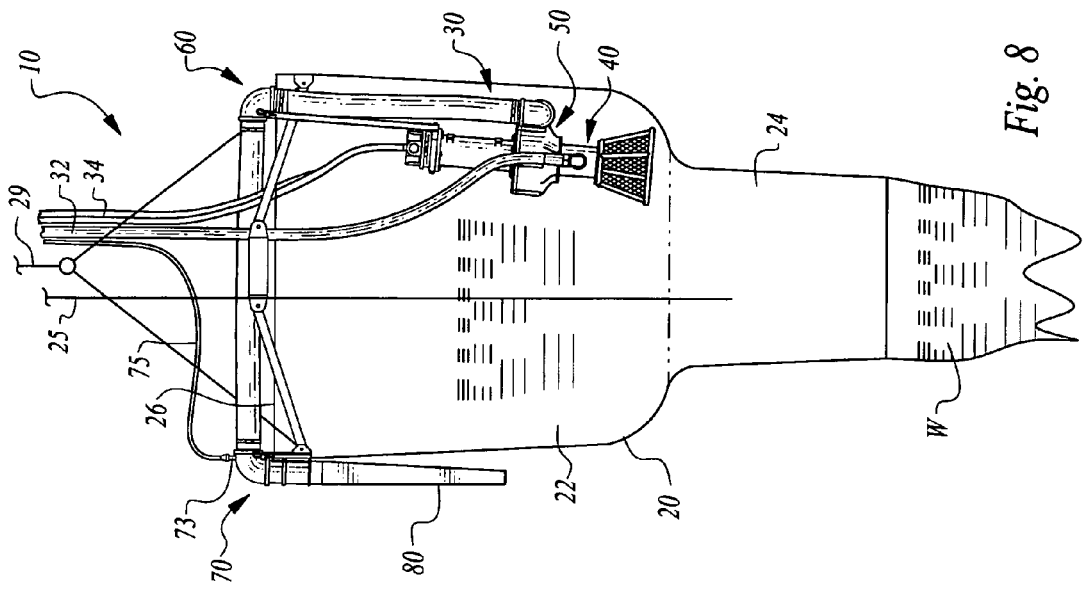
FIG. 8 is a full sectional view of the bucket of FIG. 2, but shown with water being delivered directly from the bucket in one alternative use according to this invention.

The bucket 20 is configured so that it can be dipped into a water reservoir, such as a river, pond, lake or the ocean. The bucket 20 falls over sideways and water pours into the bucket. Once the bucket 20 is full, the aircraft A can lift up and carry the water to an area to be treated. The floor 24 is coupled to an aperture control line 25 and an aperture in the floor 24 can be opened by pulling on the aperture control line 25 (FIG. 8). This aperture control line 25 typically extends up to the aircraft A so that both suspension of the bucket 20 and control of the aperture in the floor 24 of the bucket 20 are provided from the aircraft A.

With this invention, the aperture in the floor 24 of the bucket 20 is typically not used. Rather, the blender assembly 30 fits within the bucket 20 and pumps water out of the bucket 20 and hydrated gel is sprayed from the delivery system 10 mounted on the bucket 20. Typically, the aperture control line 25 would not be disabled when utilizing the bucket 20 with the delivery system 10 of this invention. Thus, should it be desired to dump remaining water W from the bucket 20, such as after fire suppression gel concentrate has been depleted, the aperture control line 25 can still be utilized to open the floor 24 and allow release of water W from the bucket 20.

As an alternative to the bucket 20, the aircraft A can be fitted with fixed tanks for containing water. Such tanks are known which are filled by a snorkel pump extending down from the aircraft A and dipped into a water reservoir, such as a pond, lake or river. The blender assembly 30 would be installed within such a tank or adjacent thereto with access to water from the tank. The blender assembly in such a fixed tank embodiment could be within or adjacent the tank. As another alternative, the snorkel pump could be replaced by the blender assembly 30 appropriately modified. In such an embodiment, the pump motor 58 would be sized to lift the water up the snorkel to the tank. Gel concentrate could be added to the pump so that the fixed tank stores hydrated gel.

Figure 5:
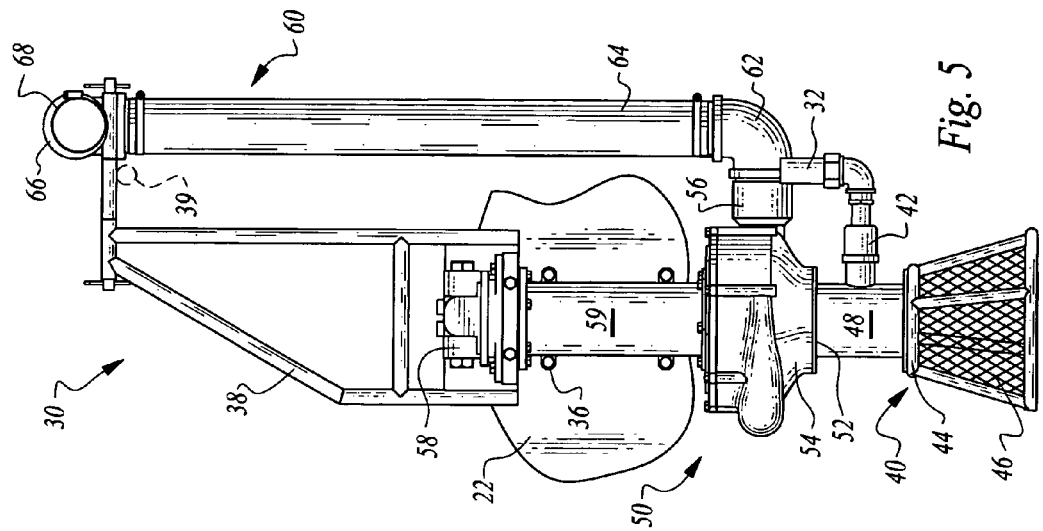
FIG. 5 is a front elevation view of that which is shown in FIGS. 3 and 4.
Figure 4:
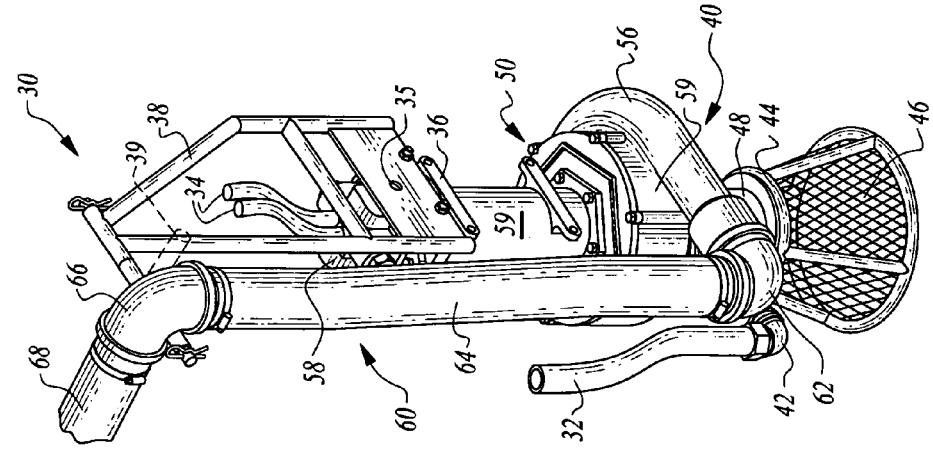
FIGS. 3 and 4 are perspective views of the gel blender assembly of an embodiment of this invention shown separate from the bucket or related equipment.
Figure 3:
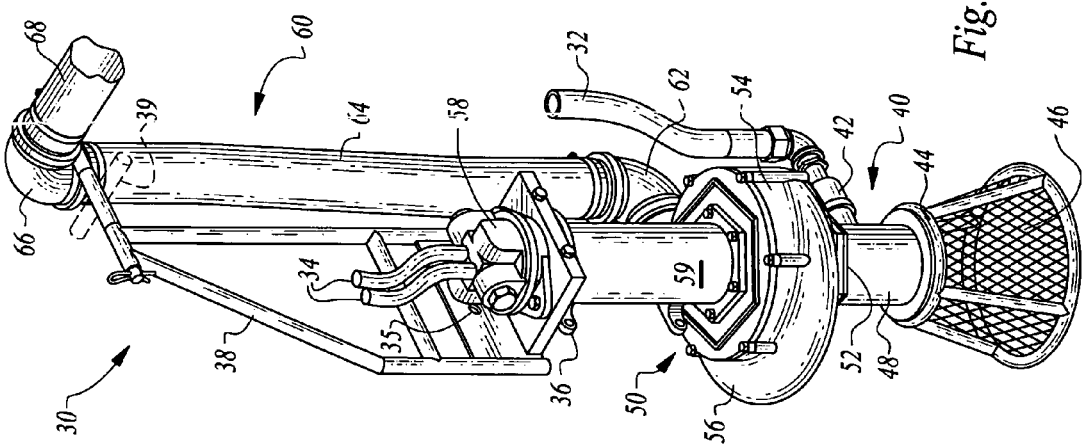

With continuing reference to FIG. 2, as well as FIGS. 3-5, details of the blender assembly 30 of the delivery system 10 of the preferred embodiment are described. This blender assembly 30 is shown mounted within the bucket 20, but could alternatively be located within a tank of water W mounted to either an aircraft A or some other mobile or stationary platform. The blender assembly 30 could be permanently affixed to the bucket 20 or integrally formed within the bucket 20, but most preferably is removably attachable to the bucket 20 so that the blender assembly 30 can be moved from one bucket 20 to another bucket 20 when desired. Attachment of the blender assembly 30 to the bucket 20 is sufficiently adapted to work with the bucket 20 so that the bucket 20 does not require modification and is not damaged or altered by removal of the blender assembly 30 from the bucket 20.

The blender assembly 30 includes a series of lines which supply power and materials for utilization of the blender assembly 30. In particular, a gel concentrate supply line 32 extends from the blender assembly 30 to a source of gel concentrate. Typically this source of gel concentrate is adjacent the aircraft A, such as in a tank mounted to or carried within or under the aircraft A (see broken lines in FIG. 1 generally depicting such a tank). Thus, the gel supply line 32 typically extends vertically up from the blender assembly 30 within the bucket 20 up to the aircraft A. Hydraulic lines 34 are preferably utilized to power a hydraulic motor which drives the pump 50. The hydraulic lines 34 preferably include a supply and return line bundled together and also extend up to the aircraft A where pressurized hydraulic fluid from the aircraft A can be utilized to drive the motor 58 of the pump 50. Typically, also a color dye line 75 extends down to the bucket 20 from the aircraft A. The color line 75 supplies a colorant which can be added to the hydrated gel before being sprayed from the discharge, such as in the form of the nozzle 70, so that areas that have been treated can more easily be seen.

The blender assembly can include a mounting bracket 36 for attachment of the blender assembly 30 to adjacent structures or for mounting of auxiliary equipment to the blender assembly 30. Preferably, a plate with a bungee hole 35 therein is provided as part of the blender assembly 30. A bungee cord or other line can pass through this bungee hole 35 and secure the blender assembly 30 to a side of the bucket 20 so that the blender assembly 30 is prevented from flopping around too much within the bucket 20.

A hose support arch 38 is configured along with the blender assembly 30 which is generally in the form of a truss and helps to hold an outlet hose from the blender assembly 30 relative to other portions of the blender assembly 30. The hose support arch 38 is carried at an upper end by a spider tube 36 which can have a leg of the spider assembly 28 passing therethrough so that the entire blender assembly 30 can be suspended from one of the spider legs of the suspension assembly 28. The hose support arch 38 extends down from this spider tube 39 and various different portions of the blender assembly 30 are carried by the hose support arch 38.

Preferably, the spider tube 39 is coupled to the hose support arch 38 through a pivotable connection, such as with a series of concentric tubes with a pin passing therethrough and with cotter pins to capture this pin within these co-linear tubes. One of the tubes has the spider tube 39 coupled thereto, one of these tubes is at an upper end of the hose support arch 38 and one of these tubes is coupled to an upper elbow 66 of interconnect conduits 60 that join the blender assembly 30 to the nozzle 70. The pivotable attachment of these parts together allows for the blender assembly 30 to pivot somewhat to a desired position and accommodate slightly different geometries for the side walls 22 of the bucket 20 and otherwise avoid damage when bumping or jostling of the blender assembly 30 occurs, such as during dipping of the bucket 20 to fill the bucket 20 with water W.

The blender assembly 30 generally includes a combiner 40 and a pump 50. The combiner 40 provides the basic function of bringing together water W and gel concentrate for hydrating of the gel concentrate to form the fire suppression gel to be utilized by the delivery system 10 of this invention. The combiner 40 is generally in the form of a "T" junction conduit 48 that allows two pathways to come together to form a single pathway. In this most preferred embodiment, this combiner 40 includes a gel inlet conduit 42 and a water inlet 44. A debris preclusion screen 46 is preferably provided surrounding the water inlet 44. The junction conduit 48 acts to bring the gel concentrate inlet conduit 42 together with the water inlet 44 and join the water W with the gel concentrate to allow for hydration of the gel concentrate. This junction conduit 48 is preferably provided upstream of the pump 50 on a suction side of the pump 50.

The pump 50 includes an inlet 52 and outlet 56. Both the inlet 52 and outlet 56 are joined to an impeller housing 54 therebetween. The motor 58 drives an impeller within the housing 54 between the inlet 52 and the outlet 56. A drive sleeve 59 extends between the motor 58 and the impeller housing 54 to space the motor from the impeller housing 54.

The pump 50 in this preferred embodiment is a centrifugal pump. In one embodiment the pump 50 has a flow rate of 400 gallons per minute. The impeller includes a series of vanes which rotate and change the fluid from extending axially at the inlet 52 to extending circumferentially at the outlet 56, by action of the impeller blades on the fluid within the housing 54. By providing the pump 50 at least as a dynamic style pump, and most preferably as a centrifugal pump, the impeller blades of such a dynamic pump 50 both act to pressurize the hydrated gel, but also act to promote mixing of the water with the gel concentrate to form the hydrated gel as a substantially homogeneous mixture. While less desirable, a positive displacement pump, such as a piston pump, could also conceivably be utilized.

Hydraulic fluid is supplied from the aircraft A down the hydraulic lines 34 to drive the motor 58. The motor 58 in turn causes the impeller to move within the impeller housing 54 so that the pump 50 causes water to be drawn into the pump 50. A typical flow rate for the pump 50 is four hundred gallons per minute, but could be scaled to meet the capacity of the aircraft and the needs of the user. If beneficial, multiple blender assemblies 30 could be used in parallel to optimize such scaling of this technology. While the motor 58 is disclosed as a hydraulic motor, an electric motor could alternatively be utilized, or conceivably an internal combustion motor.

The water W mixes with the gel concentrate to form hydrated gel which then passes out of the outlet 56 of the pump 50. Because the motor 58 is a hydraulic motor, it is inherently submersible without complex seals being required. By placing the pump 50 downstream of the combiner 40 the pump 50 pulls the water W into the inlet 44 and pulls gel concentrate into the gel inlet 42. To ensure the proper gel concentrate to water mixture ratio, the gel concentrate is preferably supplied by a positive displacement pump, such as a gear pump. The speed of this gear pump is preferably adjustable to meet the needs of the user. Such speed adjustment in turn modifies the hydrated gel viscosity.

While the hydrated gel could conceivably be delivered to some form of storage vessel, most preferably the hydrated gel is immediately utilized after manufacture by the blender assembly 30. In particular, interconnect conduits 60 are provided to direct the hydrated gel from the outlet 56 of the pump 50 to the nozzle 70. These interconnect conduits 60 include a lower elbow 62 adjacent the impeller housing 54 which converts the hydrated gel from traveling horizontally to traveling vertically adjacent the pump 50. A riser hose 54 then extends up from the lower elbow 62 up to a top of the bucket 20. An upper elbow 66 is coupled to the riser hose 64 and transitions the flow of the hydrated gel from vertical travel to substantially horizontal travel. The upper elbow 66 is preferably pivotably coupled to the suspension assembly 28 of the bucket 20 along with the spider tube 39 and hose support arch 38. A lateral hose 68 extends from the upper elbow 66 across a top of the bucket 20, typically from one side of the bucket 20 to an opposite side of the bucket 20. The interconnect conduit 60 terminates at the nozzle 70 where the lateral hose 68 joins with the inlet elbow 72 of the nozzle 70.

Figure 7:
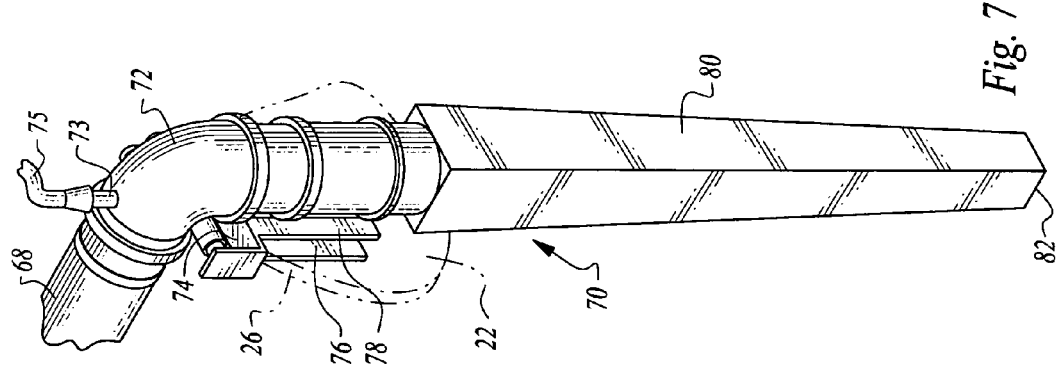
FIGS. 6 and 7 are perspective views from alternate perspectives of an outlet nozzle associated with the fire suppression gel delivery system of one embodiment of this invention.
Figure 6:
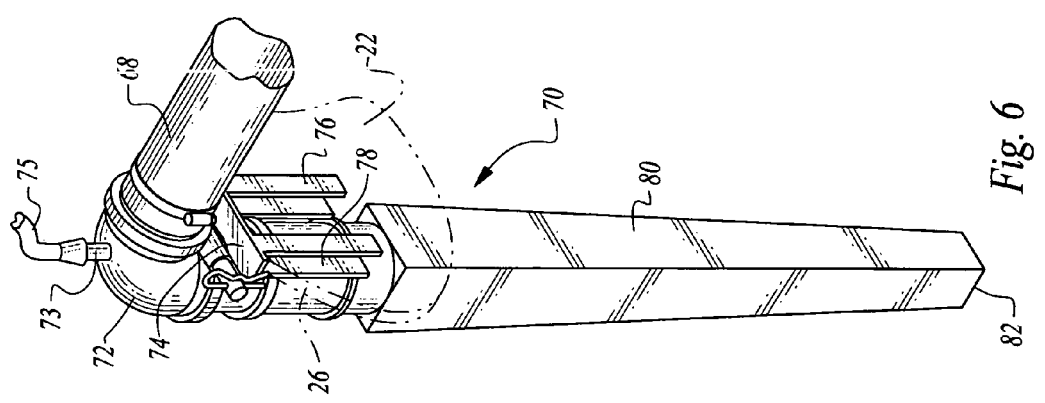

With particular reference to FIGS. 6 and 7, details of the nozzle 70, providing a preferred form of discharge for the hydrated gel, is described according to this preferred embodiment. The nozzle 70 acts to direct the hydrated gel downward for treatment of an area below the aircraft A, or otherwise function to direct the hydrated gel from the blender assembly 30 to an area to be treated. The nozzle 70 begins with an inlet elbow 72 which redirects the hydrated gel from traveling horizontally to traveling downward typically substantially vertically.

A support bracket 74 includes an inner plate 76 parallel with and opposite an outer plate 78. The inner plate 76 and outer plate 78 are spaced apart sufficient to allow them to straddle the lip 26 of the bucket 20 so that the support bracket 74 can merely rest upon the lip 26 of the bucket 20 with the nozzle 70 outboard of the bucket 20. If desired, mechanical fasteners can also be utilized.

The inlet elbow 72 is coupled to a spout 80 of the nozzle 70. This spout 80 is typically a generally rectangularly cross-sectioned elongate tube extending from the inlet elbow 72 down to an outlet 82. The outlet 82 and associated spout 80 have a shape which cause the hydrated gel to exit the nozzle 70 as a spray S which is generally in the form of a fan having a substantially constant thickness and diverging width (FIG. 1).

A width of a lower end of this fan of the spray S can be controlled by adjusting the elevation of the aircraft A. As an alternative, the spout 80 could be attached to other portions of the nozzle 70 through a quick connect coupling and different spouts 80 could be substituted for each other to change spray patterns for the spray S discharged from the nozzle 70.

Most preferably, a color port 73 is provided adjacent the inlet elbow 72. A color line 75 is coupled to this color port 73. A source of colorant, such as a colored dye liquid is preferably supplied onboard the aircraft A or adjacent the aircraft A. This source is preferably delivered by a gear pump or other adjustable positive displacement pump. This pump mixes an appropriate amount of colorant to the hydrated gel. In this way, the hydrated gel is colorized and a line L of hydrated gel (FIG. 1) that has been applied to the treatment area can be readily visually identified.

The striping technique disclosed herein can be performed from aircraft fitted with fixed tanks or a bucket with appropriate modification of mounting hardware. The striping technique could be used with hydrated gels of various concentrates, and also could be used with water only if desired. This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A system for manufacture and delivery of fire suppression gel, comprising in combination:

an aircraft;

a water container carried by said aircraft;

said water container adapted to be filled with water by accessing a water reservoir;

a source of gel concentrate;

a blender assembly;

said blender assembly including a water inlet adapted to receive water from within said container, a gel concentrate inlet coupled to said source of gel concentrate, and including a hydrated gel outlet, said blender assembly including a pump submerged within a fluid contained within said water container which pressurizes the water and hydrated gel at said outlet;

a nozzle coupled to said hydrated gel outlet, said nozzle adapted to direct the pressurized hydrated gel to an area to be treated with the gel;

wherein said water container is in the form of a bucket suspended by at least one line beneath the aircraft, said nozzle supported by said bucket;

wherein said nozzle includes an outlet pointed mostly downward and adapted to direct pressurized hydrated gel down upon the area to be treated;

wherein the nozzle outlet is oriented substantially vertically downward;

wherein said blender assembly includes a combiner adapted to combine gel concentrate from said gel concentrate inlet and water from said water inlet, said pump located downstream of said combiner;

wherein said pump is a dynamic pump with an impeller having a plurality of blades and adapted to rotate within a housing, such that said impeller blades both increase a pressure of the hydrated gel and promote mixing of the hydrated gel; and wherein a positive displacement pump is located between said source of gel concentrate and said combiner, said positive displacement pump adapted to control a flow rate of gel concentrate into said combiner.

2. The system of claim 1 wherein said gel concentrate source includes a tank borne by said aircraft separate from said water container;

wherein said blender assembly is located adjacent said bucket; and wherein a line extends between said tank and said gel concentrate inlet of said blender assembly, said line adapted to deliver gel concentrate from adjacent said aircraft to adjacent said bucket.

3. The system of claim 1 wherein said bucket is adapted to be filled with water by dipping said bucket into the water reservoir; and wherein said nozzle includes a bracket, said bracket having an inner plate spaced from an outer plate by a gap, said gap adapted to reside over a lip of said bucket with the inner plate inside of said bucket and the outer plate outside of said bucket, said support bracket straddling said lip of said bucket with said nozzle positioned outside of said bucket.

4. The system of claim 1 wherein said nozzle includes a spout in the form of an elongate tube extending to an outlet.

5. The system of claim 4 wherein said spout has a substantially rectangular cross-section.

6. A system for manufacture and delivery of fire suppression gel, comprising in combination:

an aircraft;

a water container carried by said aircraft;

said water container adapted to be filled with water by accessing a water reservoir;

a source of gel concentrate;

a blender assembly;

said blender assembly including a water inlet adapted to receive water from said water container, a gel concentrate inlet coupled to said source of gel concentrate, and including a hydrated gel outlet upstream of a discharge, the blender assembly including a pump submerged within fluid contained within said water container which pressurizes the hydrated gel at said discharge;

a nozzle coupled to said hydrated gel outlet;

said nozzle including a spout in the form of an elongate tube extending mostly downward to an outlet;

wherein said water container includes a bucket suspended beneath the aircraft by at least one elongate line and wherein said spout is supported by said bucket;

wherein the nozzle outlet is oriented substantially vertically downward;

wherein said blender assembly includes a combiner adapted to combine gel concentrate from said gel concentrate inlet and water from said water inlet, said pump located downstream of said combiner;

wherein said pump is a dynamic pump with an impeller having a plurality of blades and adapted to rotate within a housing, such that said impeller blades both increase a pressure of the hydrated gel and promote mixing of the hydrated gel; and wherein a positive displacement pump is located between said source of gel concentrate and said combiner, said positive displacement pump adapted to control a flow rate of gel concentrate into said combiner.

7. The system of claim 6 wherein said spout has a substantially rectangular cross-section.

* * * * *